(12) United States Patent
Branham

(10) Patent No.: US 7,686,274 B2
(45) Date of Patent: Mar. 30, 2010

(54) PIVOTING DETENT JOINT

(75) Inventor: Michael Dean Branham, Blythewood, SC (US)

(73) Assignee: Lang-Mekra North America LLC, Ridgeway, SC (US)

( * ) Notice: Subject to any disclaimer, the term of this patent is extended or adjusted under 35 U.S.C. 154(b) by 68 days.

(21) Appl. No.: 12/148,219

(22) Filed: Apr. 17, 2008

(65) Prior Publication Data
US 2009/0261226 A1    Oct. 22, 2009

(51) Int. Cl.
A47G 1/24    (2006.01)
(52) U.S. Cl. .................................................. 248/477
(58) Field of Classification Search ............ 248/223.41, 248/224.8, 222.41, 225, 11.292, 12, 292.14; 403/61, 59, 97
See application file for complete search history.

(56) References Cited

U.S. PATENT DOCUMENTS

| | | | |
|---|---|---|---|
| 2,712,739 A | 7/1955 | Dempster | |
| 3,119,591 A * | 1/1964 | Malecki ..................... | 248/479 |
| 3,323,842 A | 6/1967 | Hanson | |
| 3,346,229 A | 10/1967 | Carson, Jr. | |
| 4,125,244 A | 11/1978 | Lukey | |
| 4,165,156 A | 8/1979 | O'Connell | |
| 4,186,905 A | 2/1980 | Brudy | |
| 4,565,541 A | 1/1986 | Obrecht | |
| 4,623,115 A | 11/1986 | Brester | |
| 5,081,546 A | 1/1992 | Bottrill | |
| 5,102,255 A | 4/1992 | Heinz | |
| 5,432,640 A | 7/1995 | Gilbert et al. | |
| 5,639,054 A | 6/1997 | Gerndt et al. | |
| 6,024,459 A | 2/2000 | Lewis | |
| 6,286,968 B1 * | 9/2001 | Sailer et al. ................. | 359/872 |
| 6,302,549 B1 | 10/2001 | Branham et al. | |
| 6,464,589 B1 | 10/2002 | Shinozuka | |
| 6,517,439 B1 | 2/2003 | Sears | |
| 6,715,377 B1 | 4/2004 | Brouwer | |
| 6,896,436 B2 | 5/2005 | McDevitt | |
| 6,929,418 B2 | 8/2005 | McDevitt | |

(Continued)

FOREIGN PATENT DOCUMENTS

EP    0 075 259 A1    3/1983

OTHER PUBLICATIONS

EP Search Report—Appl. No. 09 15 6704, May 7, 2009, MEKRA Lang GmbH & Co.

*Primary Examiner*—J. Allen Shriver, II
*Assistant Examiner*—Erin Smith
(74) *Attorney, Agent, or Firm*—McNair Law Firm, P.A.; Seann P. Lahey

(57) ABSTRACT

A pivoting detent joint for an exterior vehicle mirror assembly comprising a support arm for carrying a mirror head; a mounting bracket for being affixed to a vehicle exterior and carrying said support arm; a base keyway included in said mounting bracket; a key received in sliding engagement with said base keyway along a first axis; a lower detent member having a detent keyway receiving said key in sliding engagement along a second axis perpendicular to said first axis; and, an upper detent member carried by said support arm engaging said lower detent member to hold said support arm in a selected position; whereby said support arm pivots along said first axis and said second axis to accommodate misalignment between said mounting bracket and said support arm to maintain proper detent resistance of said upper and lower detent members.

15 Claims, 5 Drawing Sheets

U.S. PATENT DOCUMENTS

| | | |
|---|---|---|
| 7,048,395 B2 | 5/2006 | Lang et al. |
| 7,137,715 B2 | 11/2006 | Schuurmans et al. |
| 7,166,132 B2 | 1/2007 | Callaway et al. |
| 7,207,683 B2 | 4/2007 | Lewis |

* cited by examiner

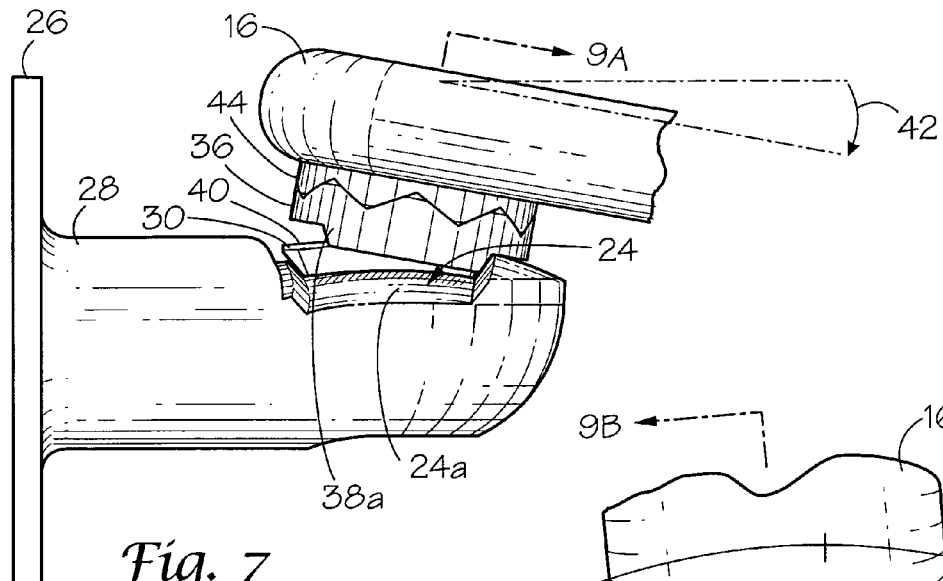
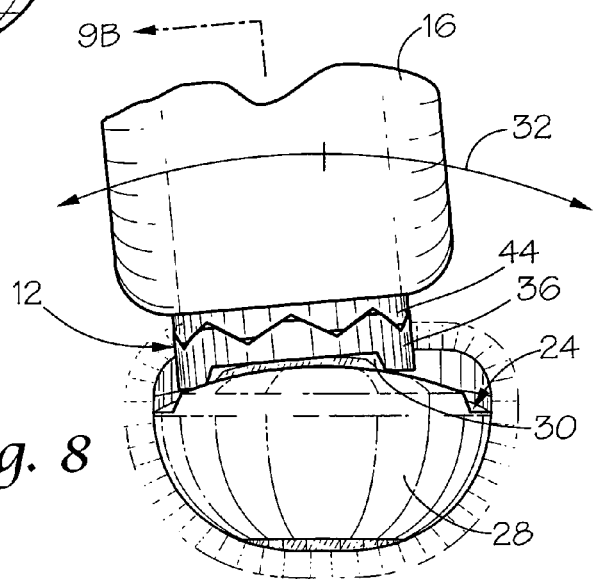
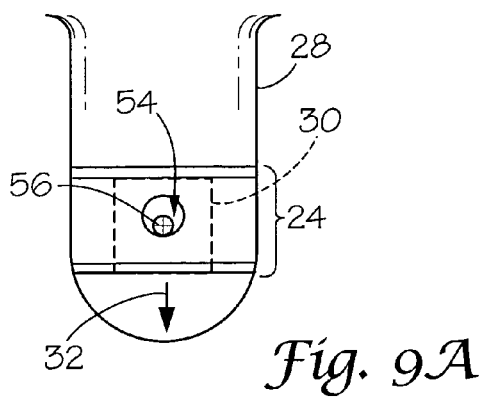
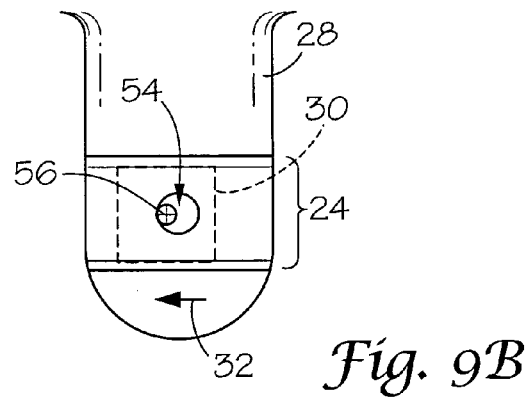

PIVOTING DETENT JOINT

BACKGROUND OF THE INVENTION

1) Field of the Invention

The present invention relates to exterior vehicle mirror assemblies, and more particularly, to a sliding detent joint for large commercial vehicle mirror assemblies that allows for multi-axis movement at the detent joint to accommodate misalignment between a mounting bracket and mirror head support arm when mounted to the vehicle while maintaining the proper detent function between the mounting bracket and mirror head support arm to hold the mirror assembly in a desired position.

2) Description of Related Art

Exterior mirror assemblies are known to include a detent connection joint between a mounting bracket attached to the vehicle and a support arm carrying the mirror head so that the mirror can be selectively positioned and held in place. However, manufacturing variances for large exterior vehicle mirror assemblies typically result in some degree of misalignment between the two detent surfaces when mounted to the vehicle. In some cases the parts are flexible enough to accommodate slight misalignment. This, however, leads to line and point contact location in the detent joint that create premature wear and tear on the joint. This wear will eventually cause the detent joint to loosen over time from vibration and fail to hold the mirror assembly in the selected position. In other cases, the mirror assembly system will not accommodate any misalignment and results in poor or limited detent performance when mounted to the vehicle.

U.S. Pat. No. 6,715,377 (Brouwer) shows a movement mechanism comprising a spherical holder and a spherical bowl which cooperate through various ridges and grooves to selectively move about an X-axis or a Y-axis. There is no disclosure of a detent mechanism or that this arrangement would be adaptable to connecting a mirror support arm to a mounting bracket.

U.S. Pat. No. 5,432,640 (Gilbert et al.) shows a mirror assembly pivotal about one axis. The mirror assembly cannot pivot in multiple directions and does not disclose accommodating misalignment between components.

U.S. Pat. No. 6,896,436 (McDevitt) shows a mounting hub 18 rotated about an X-axis and Y-axis. There is no disclosure of a detent mechanism as part of the joint assembly to hold the position of the unit that would be adaptable to vehicle mirror assemblies.

U.S. Pat. No. 4,186,905 (Brudy) shows a truck mirror that includes a detent member with grooves and complementary engaging member that includes spaced projections. Axial compression of a spring moves the grooves into engagement with the projections. There is no disclosure in the specification of any tolerance for misalignment in this arrangement. Movement of this detent mechanism is limited strictly to a single vertical axis which would not address the problem of multi-axis misalignment between the support arm and mounting bracket.

U.S. Pat. No. 5,081,546 (Bottrill) shows a vehicle exterior mirror that includes detent formations that includes a compression spring. Misalignment is prevented by allowing a wobble in the washer connector. There is no disclosure of cooperating surfaces on the detent mechanism that adjust to allow for multi-axis movement.

U.S. Pat. No. 7,137,715 (Schuurmans et al.) shows an external vehicle mirror that includes cooperating engaging members to form a detent arrangement, and a spring adapted to hold the detent arrangement engaged. There is no disclosure of cooperating surfaces on the detent mechanism that adjust to accommodate misalignment.

None of the cited patents or known prior art teach a detent joint for a mirror assembly that allows for multi-axis rotation while maintaining proper detent resistance. Thus, there is a need for improvement in the art to provide a detent joint for exterior mirror assemblies that maintains a proper detent connection while preventing uneven wear by accommodating misalignment.

Accordingly, it is an object of the present invention to provide a detent joint connection that will forgive misalignment between a mounting bracket and support arm when mounted to a vehicle.

SUMMARY OF THE INVENTION

The above objective is accomplished according to the present invention by providing a pivoting detent joint for an exterior vehicle mirror assembly comprising a support arm for carrying a mirror head; a mounting bracket for being affixed to a vehicle exterior and carrying the support arm; a base keyway included in the mounting bracket having a convex engaging surface extending across at least a portion of the mounting bracket generally in one of a parallel and perpendicular orientation to a side of the vehicle adjacent the mounting bracket; a key received in sliding engagement with the base keyway so that the key pivots on a first axis traversing the base keyway, wherein the key includes a concave bottom surface complementary to the convex engaging surface of the base keyway; a lower detent member having a detent keyway receiving the key in sliding engagement, the detent keyway having a concave engaging surface complementary to a convex top surface of the key so that the lower detent member pivots on the key along a second axis that traverses the key in a direction perpendicular to the first axis; and, an upper detent member carried by the support arm engaging the lower detent member in a cooperating arrangement to hold the support arm in a selected position relative to the mounting bracket; whereby the support arm pivots along the first axis and the second axis to accommodate misalignment between the mounting bracket and the support arm to maintain proper detent resistance of the upper and lower detent members.

In a further embodiment, the mounting bracket includes a base plate adapted for mounting to the vehicle exterior, and a base arm extending generally laterally outward from the base plate for carrying the support arm. Preferably, the base keyway is defined by a recessed channel formed in the base arm.

In a further embodiment, the convex engaging surface of the base keyway is a generally spherical segment to provide a constant radius of curvature across the convex engaging surface for receiving the key.

In a further embodiment, the upper detent member and the lower detent member include a series of cooperating grooves and ridges circularly arranged for releasably interlocking the upper and lower detent members together.

In a further embodiment, a central pivot conduit is provided extending through the base keyway, the key, and the lower detent member; and, a securing member disposed in the central pivot conduit interconnecting the mounting bracket to the support arm to provide a biasing force to maintain engagement between the upper and the lower detent members.

In a further embodiment, a pivot gap is provided between the securing member and an interior side wall of the central pivot conduit to allow for pivotal movement of the support arm relative to the mounting bracket.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 7 shows a side elevation view of the pivoting detent joint pivoting along a first axis according to the present invention;

FIG. 8 shows a front elevation view of the pivoting detent joint pivoting along a second axis according to the present invention; and, FIG. 9A-9B shows a top view of the securing member position correlated to pivotal movement of the support arm in FIGS. 7 and 8, respectively.

DETAILED DESCRIPTION OF A PREFERRED EMBODIMENT

Figure 1:
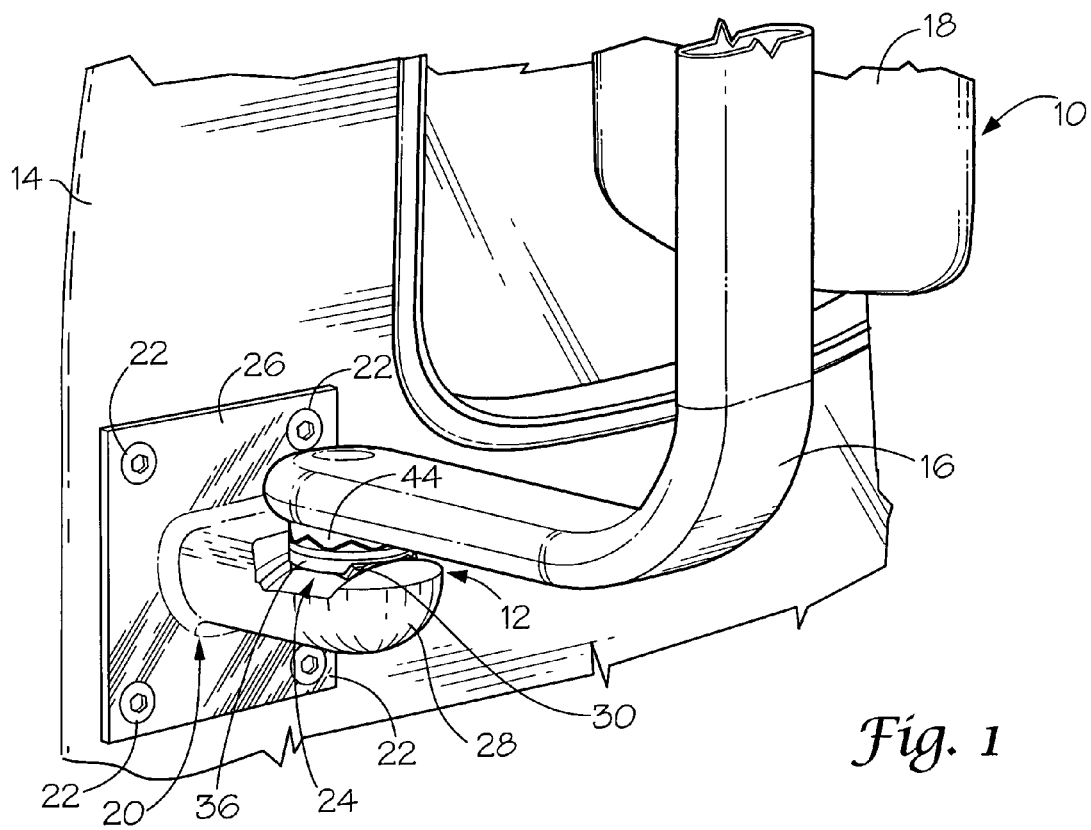
FIG. 1 shows a perspective view of a pivoting detent joint for an exterior vehicle mirror assembly mounted to a vehicle according to the present invention.
Figure 2:
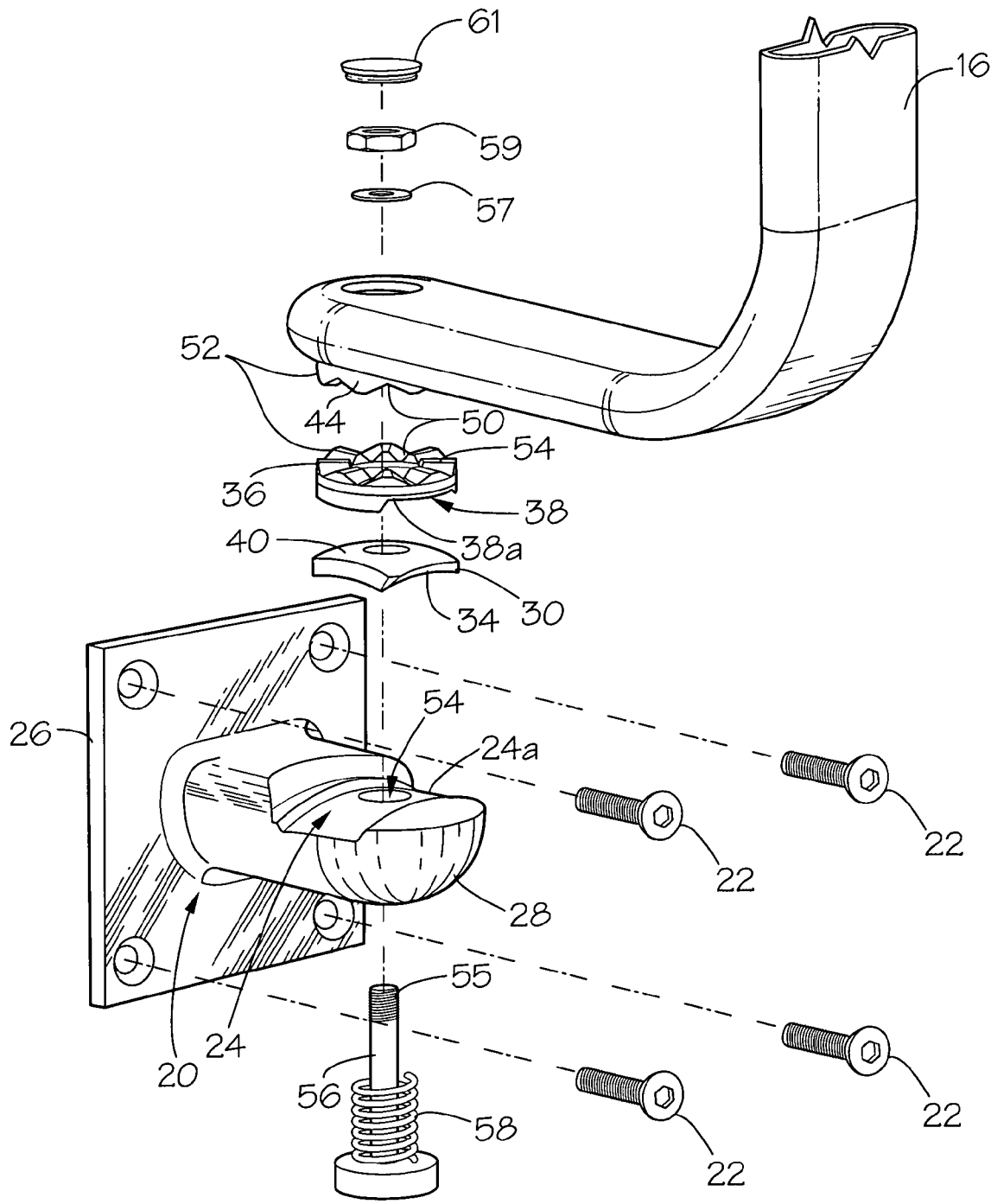
FIG. 2 shows an exploded view of the pivoting detent joint according to the present invention.
Figure 3:
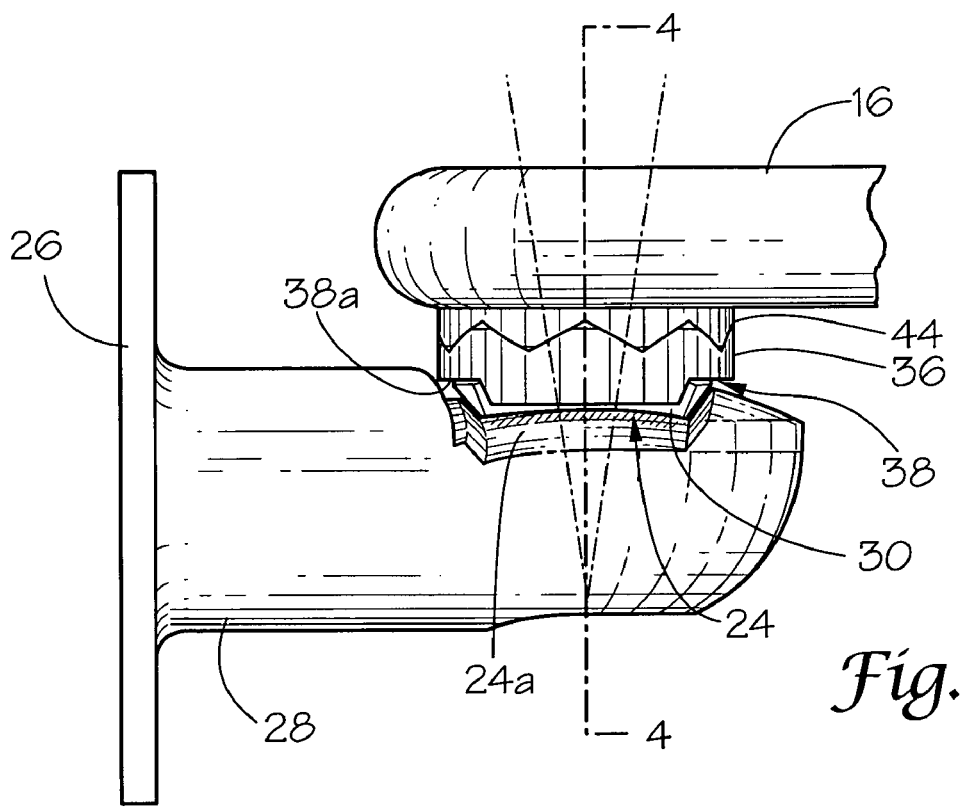
FIG. 3 shows a side elevation view of the pivoting detent joint according to the present invention.
Figure 5:
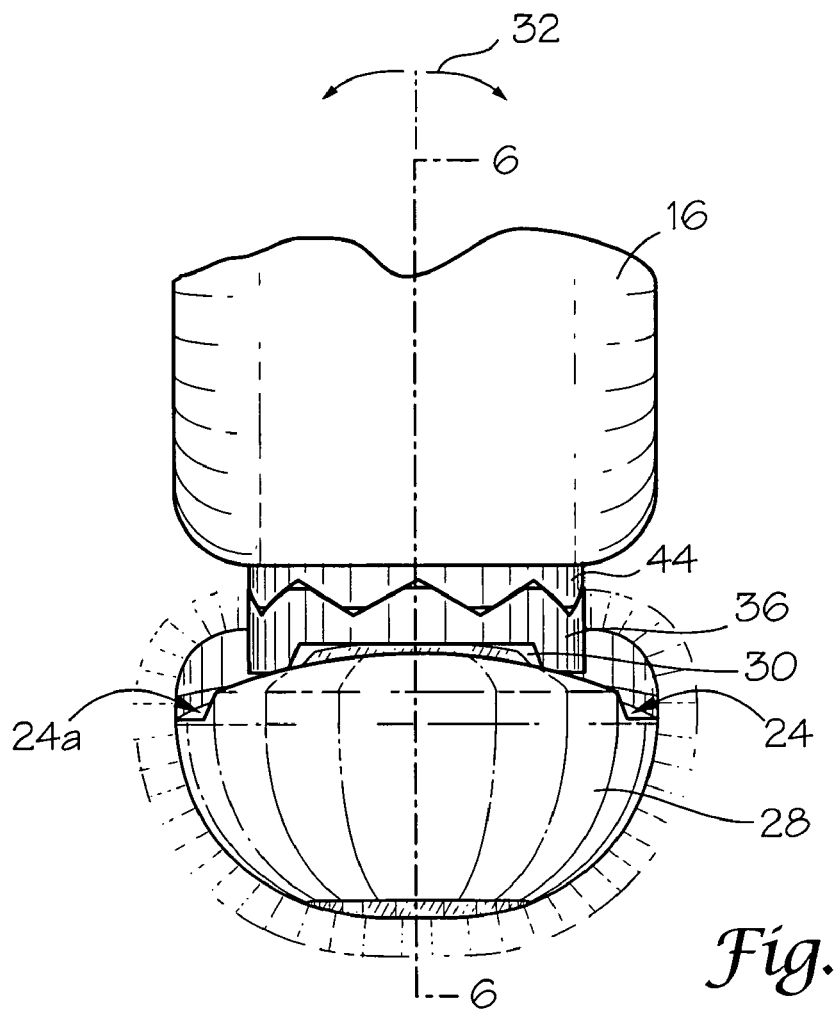
FIG. 5 shows a front elevation view of the pivoting detent joint according to the present invention.

With reference to the drawings, the invention will now be described in more detail. Referring to FIG. 1, an exterior vehicle mirror assembly, designated generally as 10, is provided with a pivoting detent joint, designated generally as 12, mounted to a vehicle exterior 14 to accommodate misalignment during installation of mirror assembly 10 on the vehicle. With further reference to FIGS. 2, 3 and 5, in the illustrated embodiment, a support arm 16 having a generally C-loop shape is provided for carrying a mirror head 18. A mounting bracket, designated generally as 20, is provided for being affixed to vehicle exterior 14. Mounting bracket 20 may be affixed using screws 22 or other well-known fastening members sufficient to secure mounting bracket 20 to the vehicle. Mounting bracket 20 carries support arm 16 in a pivotal arrangement as detailed herein below to accommodate any misalignment during installation. Mounting bracket 20 may include a base plate 26 adapted for mounting directly to vehicle exterior 14. A base arm 28 is then provided in this embodiment which extends generally laterally outward from base plate 26 for carrying support arm 16.

A base keyway 24 is carried by mounting bracket 20. Base keyway 24 is defined by a recessed channel formed in mounting bracket 20. In the illustrated embodiment, base keyway 24 extends across a top side of mounting bracket 20. Depending on whether pivoting detent joint 12 is an upper or a lower joint for support arm 16, base keyway 24 may be located on either of an upper or lower side of mounting bracket 20. In the illustrated embodiment, base keyway 24 is defined by a recessed channel formed in base arm 28. To promote pivotal movement, base keyway 24 is constructed and arranged to include a convex engaging surface 24a extending across at least a portion of mounting bracket 20. Base keyway 24 and convex engaging surface 24a are constructed and arranged to extend in one of a parallel and perpendicular orientation to the exterior side 14 of the vehicle adjacent mounting bracket 20 to establish a first axis of travel for support arm 16. Preferably, as shown in the illustrated embodiment, base keyway 24 extended parallel to the side of the vehicle, but is not limited to this arrangement. Base keyway 24 may be formed at any orientation in relation to the vehicle exterior to accomplish a desired path of movement for support arm 16. Preferably, convex engaging surface 24a of base keyway 24 is a generally spherical segment to provide a constant radius of curvature across convex engaging surface 24a for receiving a key in uniform engagement.

A key 30 is placed in sliding engagement with base keyway 24 so that key 30 pivots on a first axis 32 (FIG. 8) traversing base keyway 24. As detailed above, first axis 32 of pivotal movement is generally parallel to the side of the vehicle, or as otherwise defined by the orientation of base keyway 24 on mounting bracket 20. To provide for a complementary engagement with convex engaging surface 24a of base keyway 24, key 30 is constructed and arranged to include a concave bottom surface 34 having generally the same radius of curvature as convex engaging surface 24a of base keyway 24 for uniform and consistent sliding engagement. Preferably, the angle of the contact surfaces between base keyway 24 and key 30 should be developed so that there is no rotation between the two parts when the mirror is folded away against the side of the vehicle.

Referring to FIG. 2, a lower detent member 36 is provided having a detent keyway, designated generally as 38, that receives a top surface of key 30 in sliding engagement. Further referring to FIG. 4, detent keyway 38 also has a concave engaging surface 38a complementary to a convex top surface 40 of key 30 so that lower detent member 36 pivots on key 30 along a second axis 42 (FIG. 7) that traverses key 30 in a direction perpendicular to first axis 32. The contact surfaces shown between key 30 and detent keyway 38 are revolved around a line that passes through the center of the engaging surfaces. The angle and/or shape of the surface between detent keyway 38 and key 30 should be developed to give the proper foldaway force. Keyways on base arm 28 and lower determent member 36 with linear angled sides, traditional detent shape, or other geometry may be considered.

Figure 1A:
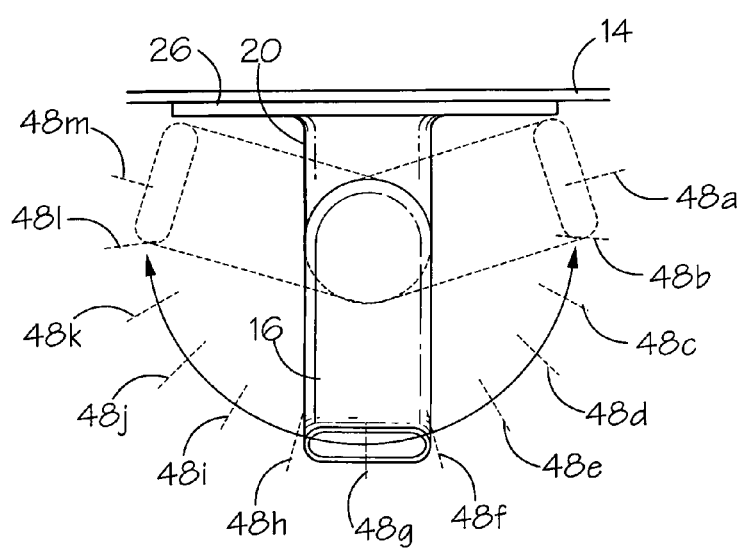
FIG. 1A shows a top cut-away view of the pivoting detent joint according to the present invention.

Referring to FIGS. 1 and 2, an upper detent member 44 is carried by support arm 16 engaging lower detent member 36 in a cooperating arrangement to hold support arm 16 in a selected position relative to mounting bracket 20. With further reference to FIG. 1A, support arm 16 rotates in direction 46 to position support arm 16. Cooperating engagement between upper detent member 44 and lower detent member 36 selectively holds support arm 16 at one of a plurality of position points 48a-48m. The number and position of each position point is generally dictated by the detent geometries and may include more or less position points as desired by adjusting the number of cooperating grooves and ridges between the detent members. Referring to FIG. 2, in the preferred embodiment, upper detent member 44 and lower detent member 36 include a series of cooperating grooves 50 and ridges 52, circularly arranged for releasably interlocking the upper and lower detent members together. Other detent arrangement are well-known to those skilled in the art and any mechanism that temporarily keeps one part in a certain position relative to that of another, and can be released by applying force to one of the parts is operative to accomplish this task and considered within the spirit and scope of the present invention.

Figure 4:
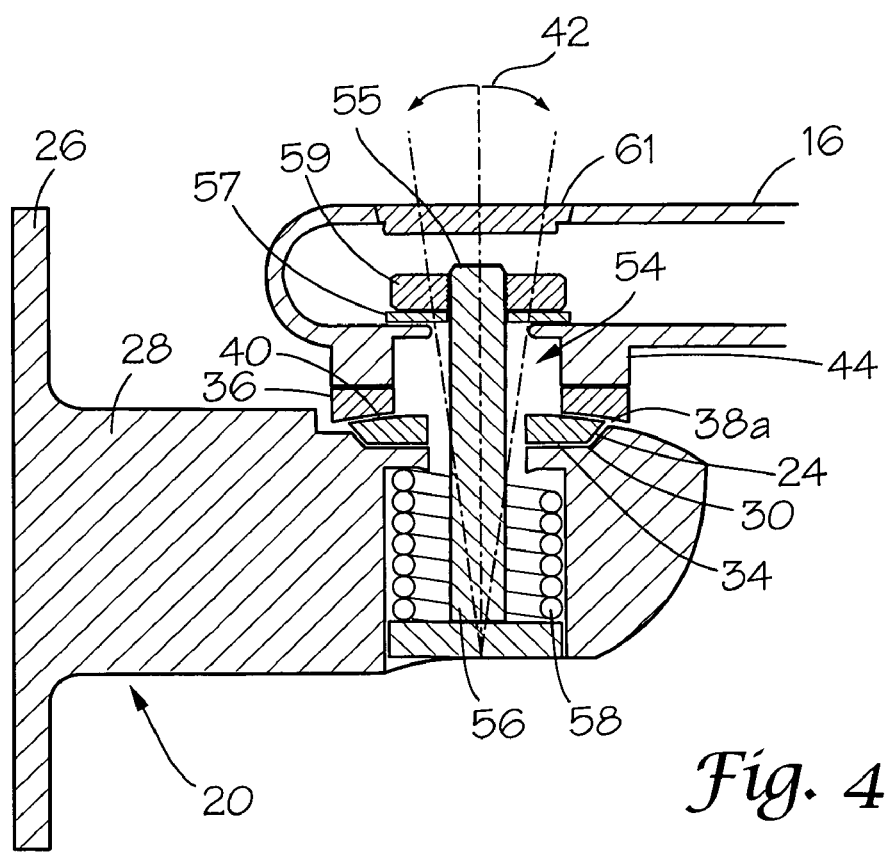
FIG. 4 shows a side cross-section view of the pivoting detent joint according to the present invention.
Figure 6:
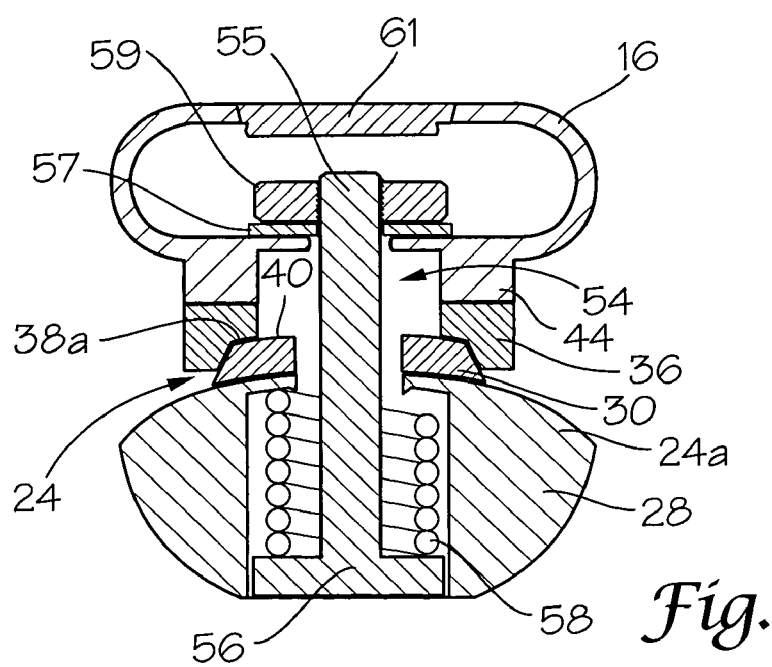
FIG. 6 shows a front cross-section view of the pivoting detent joint according to the present invention.

Referring to FIGS. 2, 4 and 6, a central pivot conduit, designated generally as 54, is provided that extends through base keyway 24, key 30, and lower detent member 36. A securing member 56 is inserted through central pivot conduit 54 that interconnects mounting bracket 20 to support arm 16. A spring member 58 is operatively associated with securing member 56 to provide a biasing force to maintain engagement between upper and lower detent members 44 and 36, respectively. In the illustrated embodiment, spring member 58 is disposed in and biased against base arm 28 and securing member 56 to pull support arm 16 towards base arm 28. Distal end 55 of securing member 56 may be threaded for receiving a washer 57 and nut 59 to secure distal end 55 against support arm 16. An access cap 61 may be provided for opening to the interior of support arm 16 to attach washer 57 and nut 59 to securing member 56. This arrangement is one way of securing the components of the joint together, but is provided by way of example only and is not limited to the illustrated embodiment as other well-known methods could alternatively be employed to accomplish the same arrangement.

Referring to FIGS. 4, 6 and 9A-9B, a pivot gap, designated generally as 60, is provided between securing member 56 and an interior side wall 62 of central pivot conduit 54 to allow for pivotal movement of support arm 16 relative to mounting bracket 20. This allows securing member 56 to move within central pivot conduit 54 so that support arm 16 may pivot along first axis 32 and second axis 42 to accommodate misalignment between mounting bracket 20 and support arm 16 to maintain proper detent resistance of upper and lower detent members 44 and 36, respectively.

While a preferred embodiment of the invention has been described using specific terms, such description is for illustrative purposes only, and it is to be understood that changes and variations may be made without departing from the spirit or scope of the following claims.

What is claimed is:

1. A pivoting detent joint for an exterior vehicle mirror assembly comprising:
    a support arm for carrying a mirror head;
    a mounting bracket for being affixed to a vehicle exterior and carrying said support arm;
    a base keyway included in said mounting bracket having a convex engaging surface extending across at least a portion of said mounting bracket generally in one of a parallel and perpendicular orientation to a side of the vehicle adjacent said mounting bracket;
    a key received in sliding engagement with said base keyway so that said key pivots on a first axis traversing said base keyway, wherein said key includes a concave bottom surface complementary to said convex engaging surface of said base keyway;
    a lower detent member having a detent keyway receiving said key in sliding engagement, said detent keyway having a concave engaging surface complementary to a convex top surface of said key so that said lower detent member pivots on said key along a second axis that traverses said key in a direction perpendicular to said first axis; and,
    an upper detent member carried by said support arm engaging said lower detent member in a cooperating arrangement to hold said support arm in a selected position relative to said mounting bracket;
    whereby said support arm pivots along said first axis and said second axis to accommodate misalignment between said mounting bracket and said support arm to maintain proper detent resistance of said upper and lower detent members.

2. The pivoting detent joint of claim 1 wherein said mounting bracket includes a base plate adapted for mounting to the vehicle exterior, and a base arm extending generally laterally outward from said base plate for carrying said support arm.

3. The pivoting detent joint of claim 2 wherein said base keyway is defined by a recessed channel formed in said base arm.

4. The pivoting detent joint of claim 1 wherein said convex engaging surface of said base keyway is a generally spherical segment to provide a constant radius of curvature across said convex engaging surface for receiving said key.

5. The pivoting detent joint of claim 1 wherein said upper detent member and said lower detent member include a series of cooperating grooves and ridges circularly arranged for releasably interlocking said upper and lower detent members together.

6. The pivoting detent joint of claim 1 including a central pivot conduit extending through said base keyway, said key, and said lower detent member; and, a securing member disposed in said central pivot conduit interconnecting said mounting bracket to said support arm to provide a biasing force to maintain engagement between said upper and said lower detent members.

7. The pivoting detent joint of claim 6 including a pivot gap provided between said securing member and an interior side wall of said central pivot conduit to allow for pivotal movement of said support arm relative to said mounting bracket.

8. In combination, a vehicle and an exterior vehicle mirror assembly having a pivoting detent joint for accommodating misalignment during mounting of the mirror assembly to the vehicle, said pivoting detent joint comprising:
    a support arm carrying a mirror head;
    a mounting bracket affixed to a vehicle exterior and carrying said support arm;
    a base keyway included in said mounting bracket;
    said base keyway has a convex engaging surface extending across at least a portion of said mounting bracket generally in one of a parallel and perpendicular orientation to a side of said vehicle exterior adjacent said mounting bracket;
    a key received in sliding engagement with said base keyway so that said key traverses said base keyway along a first axis;
    a lower detent member having a bottom side including a detent keyway receiving said key in sliding engagement for traversing said key along a second axis perpendicular to said first axis, and, said lower detent member having a top side including a series of grooves and ridges; and,
    an upper detent member carried by said support arm in a fixed arrangement having a series of cooperating grooves and ridges engaging said grooves and ridges of said lower detent member to hold said support arm in a selected position relative to said mounting bracket;
    whereby said support arm pivots along said first axis and said second axis to accommodate misalignment between said mounting bracket and said support arm to maintain proper detent resistance of said upper and lower detent members.

9. The pivoting detent joint of claim 8 wherein said convex engaging surface of said base keyway is a generally spherical segment to provide a constant radius of curvature across said convex engaging surface for receiving said key.

10. The pivoting detent joint of claim 9 wherein said key includes a concave bottom surface complementary to said convex engaging surface of said base keyway, wherein said concave bottom surface is a generally spherical segment to provide a constant radius of curvature across said concave bottom surface for engaging said base keyway.

11. The pivoting detent joint of claim 10 wherein said detent keyway has a concave engaging surface complementary to a convex top surface of said key, wherein said concave engaging surface of said detent keyway and said convex top surface of said key are generally spherical segments to provide a constant radius of curvature for engagement.

12. The pivoting detent joint of claim 8 wherein said mounting bracket includes a base plate mounted to said vehicle exterior, and a base arm extending generally laterally outward from said base plate for carrying said support arm.

13. The pivoting detent joint of claim 12 wherein said base keyway is defined by a recessed channel formed in said base arm.

14. The pivoting detent joint of claim 8 including a central pivot conduit extending through said base keyway, said key, and said lower detent member; and, a securing member disposed in said central pivot conduit interconnecting said mounting bracket to said support arm to provide a biasing force to maintain engagement between said upper and said lower detent members.

15. The pivoting detent joint of claim 14 including a pivot gap provided between said securing member and an interior side wall of said central pivot conduit to allow for pivotal movement of said support arm relative to said mounting bracket.

* * * * *